United States Patent [19]
Rao et al.

[11] Patent Number: 5,495,174
[45] Date of Patent: * Feb. 27, 1996

[54] METHOD AND APPARATUS FOR DETECTING BOUNDARY STRATUM AND ADJUSTING THE DIRECTION OF DRILLING TO MAINTAIN THE DRILL STRING WITHIN A BED OF INTEREST

[75] Inventors: M. Vikram Rao, Houston; Paul F. Rodney, Spring, both of Tex.

[73] Assignee: Baroid Technology, Inc., Houston, Tex.

[*] Notice: The portion of the term of this patent subsequent to Jan. 11, 2011, has been disclaimed.

[21] Appl. No.: 113,969

[22] Filed: Aug. 30, 1993

Related U.S. Application Data

[63] Continuation of Ser. No. 715,683, Jun. 14, 1991, abandoned.
[51] Int. Cl.$^6$ .............................. G01V 3/30; G01V 3/20; E21B 47/02
[52] U.S. Cl. ............................... 324/339; 175/45
[58] Field of Search ....................... 324/338, 339, 324/356, 369; 175/45; 166/250

[56] References Cited

U.S. PATENT DOCUMENTS

| | | | |
|---|---|---|---|
| 4,451,789 | 5/1984 | Meador | 324/338 |
| 4,786,874 | 11/1980 | Grosso et al. | 324/369 |
| 5,045,795 | 9/1991 | Gianzero et al. | 324/339 |
| 5,278,507 | 1/1994 | Bartel et al. | 324/338 |

*Primary Examiner*—Walter E. Snow
*Attorney, Agent, or Firm*—Browning, Bushman, Anderson & Brookhart

[57] ABSTRACT

Methods and apparatus for detecting the approach of a boundary stratum while drilling in a substantially horizontal subsurface zone using sensor tools having sensors with different depths of investigation. The two depths of investigation signals are used to reduce spurious signals. In some cases, dips or angles of the boundary strat with the borehole may be determined. In alternative embodiments, one or more electromagnetic energy transmitters are used with a single receiver pair to generate a characteristic signature of approaching boundary stratum.

12 Claims, 8 Drawing Sheets

METHOD AND APPARATUS FOR DETECTING BOUNDARY STRATUM AND ADJUSTING THE DIRECTION OF DRILLING TO MAINTAIN THE DRILL STRING WITHIN A BED OF INTEREST

This is a continuation of U.S. application Ser. No. 07/715,683 filed Jun. 14, 1991, now abandoned.

BACKGROUND OF THE INVENTION

1. Field of the Invention

The present invention generally relates to methods and apparatus for drilling in a substantially horizontal subsurface zone, and more particularly, to methods and apparatus for detecting the approach of stratum bordering the subsurface zone.

2. Related Application

This application incorporated much of the U.S. application Ser. No. 07/715,401, filed on Jun. 14, 1991, entitled WELL LOGGING METHOD AND APPARATUS PROVIDING MULTIPLE DEPTH OF INVESTIGATION USING MULTIPLE TRANSMITTERS AND SINGLE RECEIVER PAIR, in the names of M. Vikram Rao, Roger P. Bartel, and Paul F. Rodney, now U.S. Pat. No. 5,278,507.

3. Description of the Prior Art

In recent years, there has been a substantial increase in the drilling of "horizontal" wells. Such wells often have much greater productivity than the more standard "vertical" wells. It is well known in the art that these "horizontal" wells are not necessarily horizontal but rather have boreholes which follow within the boundaries of a producing subsurface zone which deviates from horizontal to some degree.

In the process of drilling such a borehole, it becomes necessary to guide the drill bit so that the borehole does not leave the boundaries of the subsurface producing zone. A boundary of a producing zone may be established by various non-oil bearing formations or it may be established by such borders as the oil-water contact level in the same producing formation. In order to avoid these boundaries and stay within the producing formation, means have been developed in the prior art, with varying success, to detect and subsequently avoid the various boundary stratum.

Two methods for detecting a boundary stratum are illustrated, respectively, in U.S. Pat. Nos. 4,786 874 and 4,601,353. Each of these methods employs a directionally focused sensor. One method generally describes a directionally focused gamma ray tool and the other method describes a directionally focused resistivity tool. These tools show a change in sensor readings as a boundary stratum is approached. The drill string may then be rotated as necessary to determine the position of the boundary stratum by the variation in magnitude of the sensor readings. Once the position of the boundary stratum is known, the driller can orient the bit to drill away from the boundary stratum.

In a paper entitled "*Response of 2 MHz LWD Resistivity and Wireline Induction Tools in Deipping Beds and Laminated Formations*", presented by Barbara Anderson et al at the SPWLA 31st Annual Logging Symposium in Jun. 24–27, 1990, there is a general review of comparing the responses of wireline induction and 2 MHz MWD tools in dipping formations.

While these methods have added to the art, they do have shortcomings. One problem with the above methods is that they operate under the assumption that a particular zone, including the borehole, is relatively homogenous as to its resistivity or its natural gamma radiation, which may or may not be true.

For instance, if the borehole, for some reason such as the particular type of formation or drilling fluid, begins to washout so that its size increases, the prior art tools would most likely signal falsely to the driller that the path of the borehole needs to be altered due to the approach of a boundary stratum. The prior art does not provide a way to distinguish such an occurrence from the actual approach of a boundary stratum. Unnecessary turning in the borehole can create future problems with the drilling or perhaps with running casing through the borehole, as well as tending to slow the speed of drilling.

Another common borehole phenomenon which can cause a false signal in the prior art tools is an accumulation of mud solids which sometimes builds up on the drilling bit, particularly in horizontal wells. These accumulations, called mudballs in the trade, have a tendency to scrape off on the face of porous and permeable rock which typically form a producing formation.

Also, if a change in a characteristic of the formation as a whole occurred, such as a generally decreasing resistivity, the prior art would have difficulty, or at least require considerable time, to distinguish this occurrence from the approach of a boundary stratum.

In some cases, while drilling through horizontal producing zones, the drillers main concern may be with the oil-water contact boundary stratum rather than other boundary stratum on the sides or from above the producing zone. The driller may wish to keep the borehole a certain distance above the oil-water contact level so as to maximize the productive life of the well. Also, the driller will probably not want to turn upwards unnecessarily. In such a case, the driller does not necessarily need a directionally focused sensor to tell him in which direction the boundary stratum is located because he already has reasonable certainty that the boundary stratum lays below the present borehole path. In fact, if the motor type drilling assembly is being used, due to the occasional necessity to change the direction of the bit, a tool with a directionally focused sensor may be focused in the wrong direction to indicate the approach of an oil-water contact boundary stratum and therefore be unreliable. Moreover, the need to reorient the tool may create undesirable drilling operations. On the other hand, the driller does need a sensor tool that will be less subject to giving false signals than the prior art tools.

In the above situation, the driller may wish to use a fixed directionally focused sensor for some purpose such as a greater depth of investigation being available. However, even then the driller requires a means for preventing spurious signals which so frequently occur with the prior art tools.

The prior art provides no acceptable method for calculating the approximate angle or dip of an approaching boundary stratum. Such information would generally be useful to the driller for various reasons. It might affect the degree of turn the driller wishes to achieve. The driller will generally desire to make the borehole as straight as possible and avoid making relatively sharp turns for such reasons as given above. Normally, the driller will want to make no more of a turn than is necessary to avoid the boundary statum.

Since information concerning dips or angles of the boundary stratum with the borehole is not available, there presently exists no system which is capable of portraying on a surface terminal or printout a schematic of the borehole along with any formations detected while drilling.

Other problems arise from relying on gamma sensors and resistivity sensors. For instance, a gamma ray tool cannot normally distinguish the oil-water contact level in the same producing zone. As previously stated, this is a boundary stratum the driller desires to avoid. Moreover, a gamma ray device generally has a depth of investigation of only a few inches, thereby providing essentially no useful information for this purpose.

Generally, in a vertical well, a resistivity tool can sense the oil-water contact level but usually requires the water to be somewhat saline so as to produce a clear contrast between the resistivities of the oil zone and the water zone. If the connate water, or water entrapped in the interstices of the formation rock, is fresh, or low in dissolved salts, it may be difficult or even impossible for a resistivity tool to distinguish the oil-water contact. In such a case, the oil-water contact level is oftentimes distinguishable with high frequency electromagnetic sensors that measure dielectric constants, oil and water having different dielectric constants.

Furthermore, U.S. Pat. No. 4,601,353, using the gamma ray tool, is probably not suitable to drilling a well with a rotary drilling assembly as compared to drilling with a motor type drilling assembly. The gamma ray signal, being naturally subject to statistical variations, has a tendency to average out during rotations making neighboring beds difficult to see.

Consequently, a need exists for improvements in techniques for detecting the approach of boundary stratum while drilling horizontal wells which will result in greater reliability and dependability of operation.

OBJECTS OF THE INVENTION

It is the primary object of the invention to provide methods and apparatus for detecting the approach of a boundary stratum, and having sensors suitable for detecting the expected types of boundary stratum, to satisfy the aforementioned needs.

In this way, it should be possible to avoid false signals indicating the approach of a boundary stratum caused by discontinuities in the borehole or changes in the producing zone as a whole.

It is also the object of the invention to make measurements that, taken together with reasonable assumptions, lead to approximations of the dips or angles of intersection of boundary stratum with the borehole.

BRIEF DESCRIPTION OF THE DRAWINGS

FIG. 1' is an elevated view of an MWD tool in accordance with the present invention which is suspended at a vertical earth borehole as part of a drill string;

FIG. 2' is an elevated view of a well logging instrument in accordance with the present invention and showing in block diagram the circuitry used in actuating the transmitters and in processing the signals received at the single receiver pair;

FIG. 3' is a pulse diagram illustrating the time sequence of transmitter pulsing;

FIG. 4' is a pulse diagram illustrating a time sequence alternative to that illustrated in FIG. 3'.

DETAILED DESCRIPTION OF THE PREFERRED EMBODIMENTS

Sensor tools of varying types with varying depths of investigation are well known in the art. While the preferred embodiment requires a sensor tool with at least two depths of investigation, the particular type of sensor used must be chosen with the application in mind. Generally a high frequency electromagnetic type of tool capable of measuring more than one characteristic of the formation such as dielectric constant and resistivity will be suitable in most cases.

Figure 1:
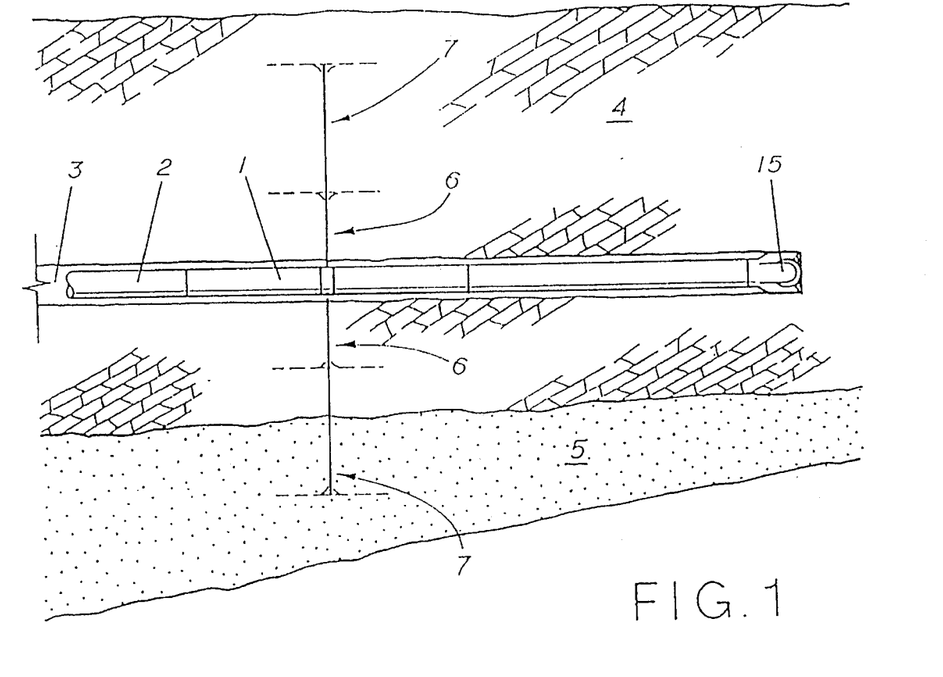
FIG. 1 is cutaway side view of a horizontal borehole through a producing zone illustrating a drill string in place within such borehole.

Referring now to the drawings, and more particularly to FIG. 1, there is shown generally a sensor tool 1 capable of reading into the formation at two depths of investigation in borehole 3 within horizontal subsurface zone 4. In the situation shown in FIG. 1, deeper reading sensor 7 will be the first sensor to show some sensor reading variation due to the approach of a boundary stratum 5.

As the sensor tool 1 goes deeper, a less deep reading sensor 6 may confirm such a signal. Since the sensor tool 1 will often be some distance "above" the bit 15, the borehole 3 already drilled prior to the indication given by the deep reading sensor 7 may continue close enough to the boundary stratum 5 for the less deep reading sensor 6 to confirm the signal given by the deeper reading sensor 7. Also, it may take a substantial amount of footage before the driller is able to effect a change in borehole direction, thus increasing the chance that the less deep sensor 6 will also detect the boundary stratum 5.

Figure 2:
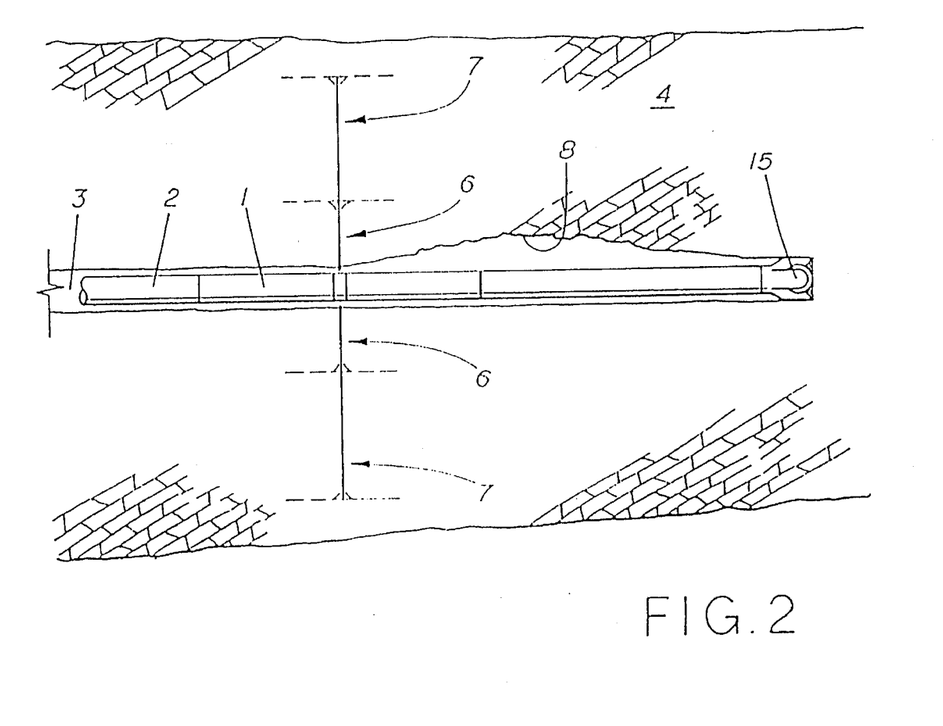
FIG. 2 is a cutaway side view of the horizontal borehole according to FIG. 1, but also including a washout in the borehole.

Referring to FIG. 2, should a borehole 3 variation, such as a washout 8, cause some change in signals, the first sensor to show a significant change will be the less deep reading sensor 6. In this way, by reviewing the logs at the earth's surface, for example, the "signature" log illustrated in FIG. 9 and discussed in more depth hereafter, the driller is able to distinguish borehole 3 changes from the approach of a boundary statum 5.

Figure 3:
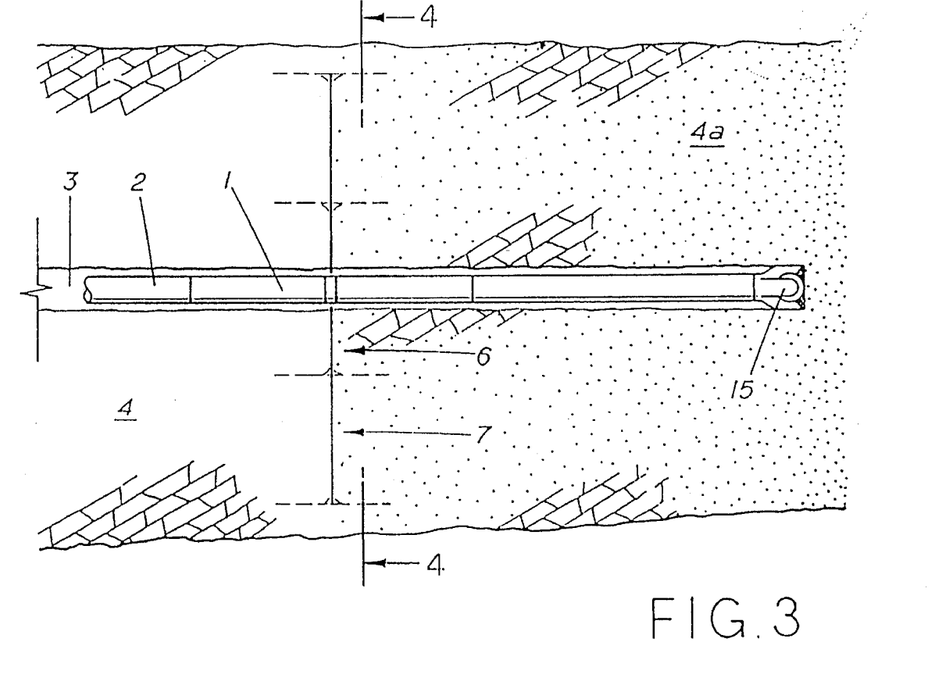
FIG. 3 is a cutaway side view of the horizontal borehole according to FIG. 1, but also illustrating a general change in a property of the producing formation.

Similarly, if characteristics of the horizontal subsurface formation 4 begin to change as a whole as portrayed in FIG. 3, both the deep 7 and the less deep reading sensors 6 will nearly simultaneously begin to change. In this way, the driller will know something other than an approaching boundary stratum is causing the change so that a more knowledgeable decision can be made sooner as to choosing the subsequent desired course of action.

Figures 4, 5:
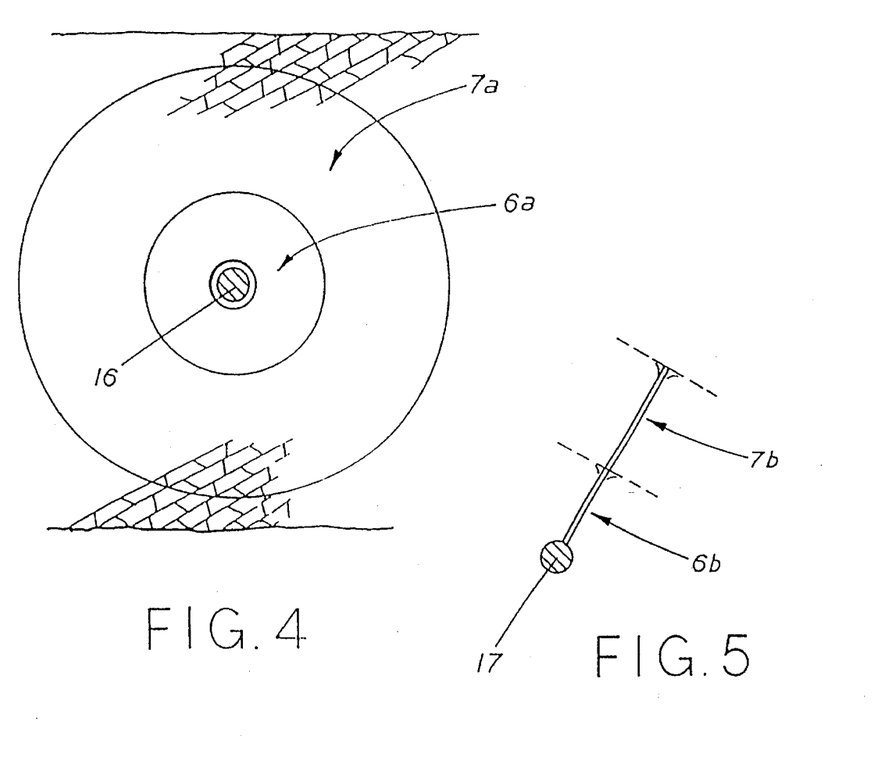
FIG. 4 is a top view of a sensor tool having symmetrically reading sensors with different depths of investigation.
FIG. 5 is a top view of a sensor tool having directionally focused sensors with different depths of investigation.
Figure 4:
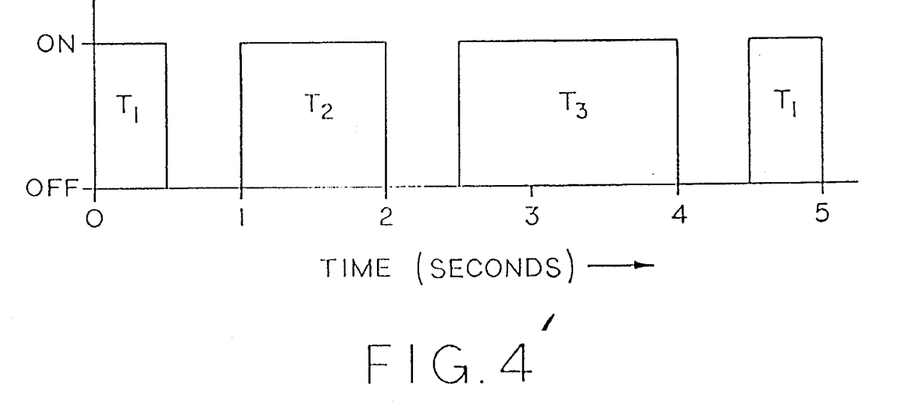

Sensor tools in FIG. 4 and FIG. 5 illustrate tools having symmetrical 16 and directionally focused sensors 17 with more than one depth of investigation. The technique of using more than one depth of investigation improves the reliability in detecting proximal beds of both symmetrical 16 and directionally focussed sensor tools 17.

If the particular drilling situation is such that the driller is concerned only with the oil-water contact boundary stratum 5 rather than possible upper or side boundaries, one may choose a tool having no directionally focused sensors 17. In such a case, a sensor tool 16 with symmetrically reading sensors having more than one depth of investigation will be effective to detect the oil-water contact boundary stratum 5 in a reliable way as explained previously.

If, however, a sensor tool with directionally focused sensors 17 is used, then having two or more depths of investigation will increase the reliability. Using a directionally focused tool 17 will generally only be advantageous in this case if the sensor tool is of a type that can be focused downward and forward. This is difficult with most tools but can be done with a 2 MHz electromagnetic tool. Focusing the tool in the forward direction is an improvement over the prior art because boundary stratum can be detected sooner.

As a further advantage of having two or more sensors with different depths of investigation, whether symmetrical or focused, the driller can maintain the borehole within a certain range away from such a boundary stratum. That is, the driller can stay close enough to the boundary so that the deep reading sensor 7a or 7b of FIG. 4 and FIG. 5 stays in contact with the boundary stratum 5 but not so close that a less deep reading sensor 6a or 6b is in contact with the boundary stratum 5.

A sensor tool 1 (see FIG. 1 ) having a deep reading sensor 7 and a less deep reading sensor 6 also allows approximate calculations of dips or angles that boundary stratum make with the borehole. It is well known in the art that the theoretical depth of investigation of a tool, generally based on geometric considerations, varies depending on the type of formation and conditions of the well bore. However, it is also a reasonable assumption that the depth of investigation of sensors of the same type, except for having a difference in depths of investigation, will be affected approximately the same when operating in the same formation conditions. This will be especially true if both sensors read rather deeply into a formation so as to be less affected by borehole conditions.

Figure 6:
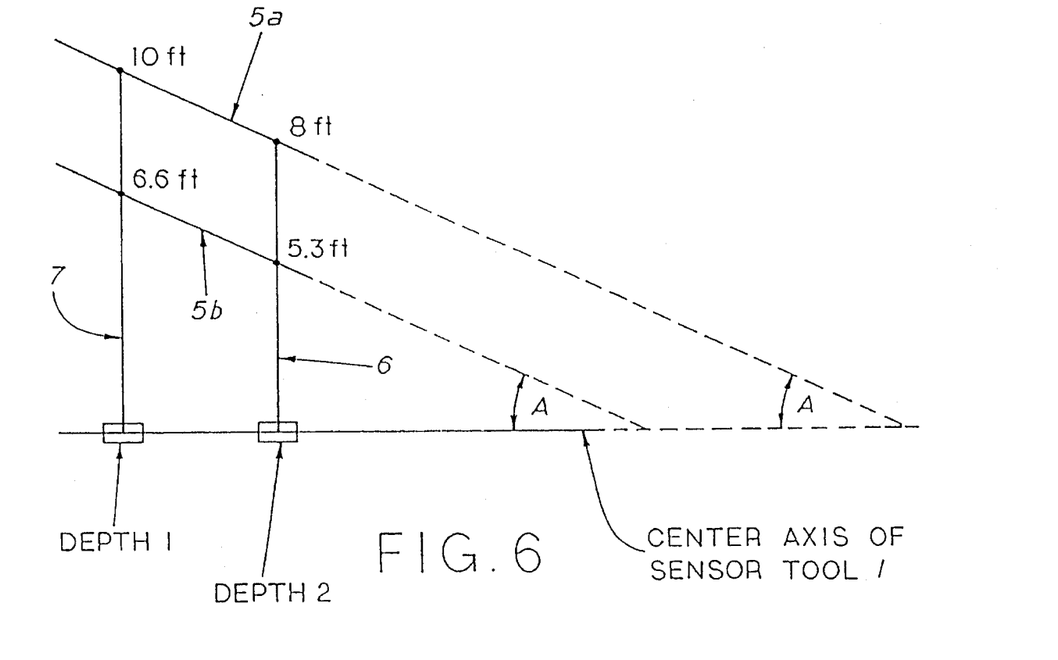
FIG. 6 is a schematic showing the effect downhole conditions have on depth of investigations of sensors.

Referring to FIG. 6, it is possible to see that if the depths of investigation of sensors are affected equally, it will still be possible to determine the angle A that a boundary stratum 5a or 5b makes with the center axis 8 of the sensor tool 1.

Assume that sensor tool 1 has a deep reading sensor 7 reading 10 ft into the formation. Then, at depth 1, when boundary stratum 5 is 10 ft. from sensor tool 1, deep reading sensor 7 will begin to show changed sensor readings. Likewise, at depth 2, the less deep reading sensor 6 reading 8 ft into the formation begins to show changed sensor readings. These two readings would allow an approximate determination of the angle A the boundary stratum makes with the center axis 8 of sensor tool 1.

Figure 9:
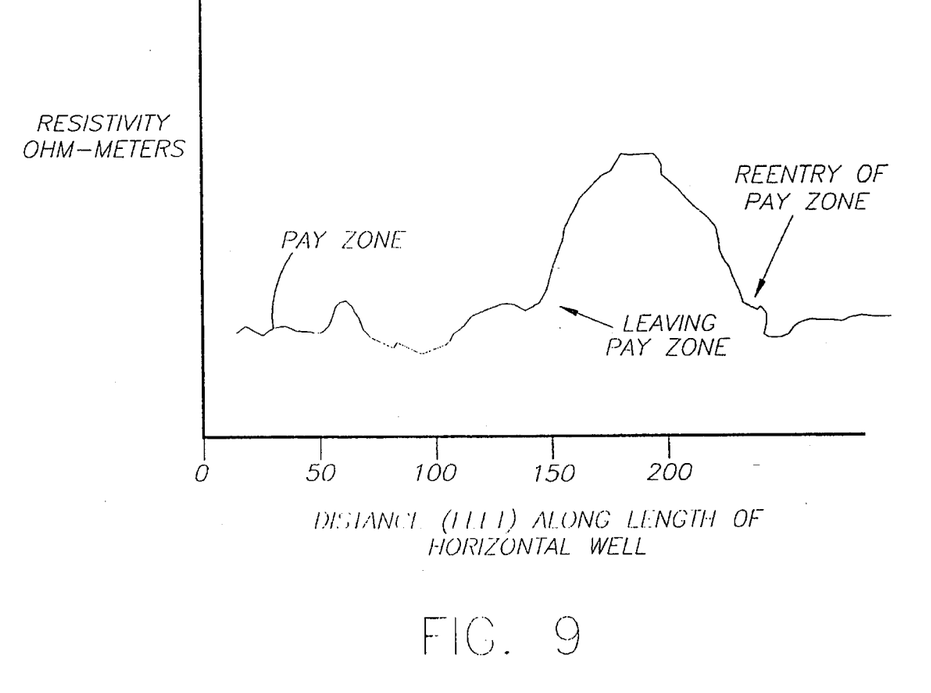
FIG. 9 graphically displays a typical "signature" illustrating the approach of the logging instrument to the entry and to the exit of a pay zone.

If in another formation, the depths of investigation of both sensors were decreased by ⅓, then the angle A would still be the same but the detectors would not detect the boundary stratum 5b until it was closer to sensor tool 1. It should be appreciated that the characteristic "signatures" of a bed boundry, for example, as is illustrated in FIG. 9, can be expected to change with the angle between the borehole axis and the bed.

Figure 7:
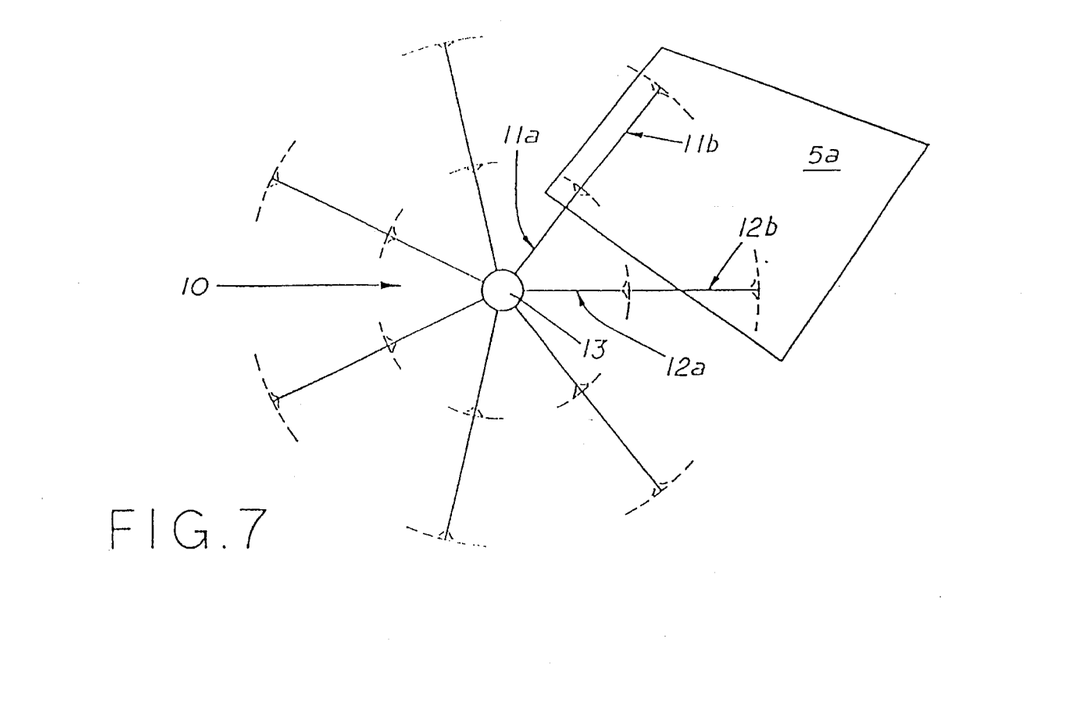
FIG. 7 is a top view of a sensor tool having groups of directionally focused sensors with each group having sensors with different depths of investigation.

Referring to FIG. 7, a sensor tool 10 with a plurality of focused sensors can be seen. FIG. 7 sensor tool 10 differs from the prior art tools used during the drilling of horizontal wells in that two depths of investigation are available for the sensor tool 10 for each sensor group 11a & 11b, 12a and 12b, etc. Each sensor group, 11a 11b, etc., is focused in a different direction. Using sensor tool 10, if three sensors, such as 11a, 11b, and 12b, detected the presence of boundary stratum 5c as shown if FIG. 7, a plane would be delineated by the sensor readings describing the orientation of boundary stratum 5c relative to the sensor tool 10.

Assuming the general angle of the sensors with respect to some tool reference point 13 on the sensor tool 10 is known, as well as the depths at which the three sensors detect the boundary stratum 5c, and the orientation of the sensor tool 10 in the borehole, then approximate dips of the formation can be calculated using formulas well known in the art.

While sensor tool 10 would probably be more suitable for acquiring dip information while using a motor type drilling assembly where sensor 10 would be in an essentially non-rotating part of the drill string, the sensor tool 17 of FIG. 5 might be more useful in a rotary type drilling assembly. As sensor tool 17 is rotated, a sampling mechanism can sample the readings periodically so that the effect would be the same or similar to having a multidirectional sensor tool such as sensor tool 10.

To determine the change necessary for a sensor reading to effectively signal that it has detected a boundary stratum, a statistical filter can be used. Such a filter adjusts to expected sensor reading variations in a particular zone through statistical methods and provides a signal when sensor readings begin to vary more than would be expected.

Figure 8:
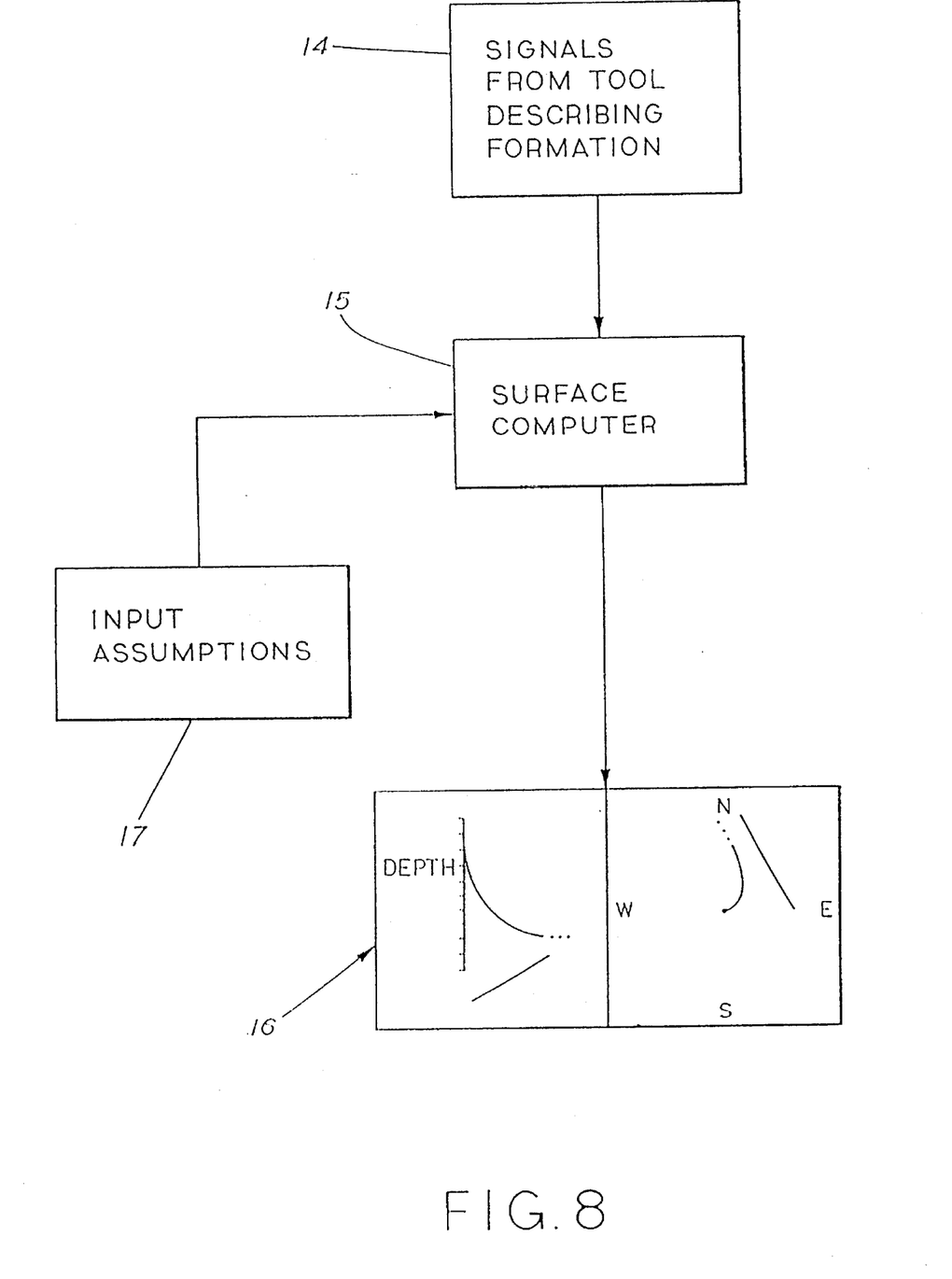
FIG. 8 is a block diagram of a system for displaying the borehole along with boundary stratum detected while drilling.

A system for processing this orientation information is illustrated in FIG. 8. The signals from the tool 14 are fed to a surface computer 15 where the information is processed and printed out or displayed on a terminal 16. A split screen picture showing the borehole with plotted dips from the vertical and from above are provided to the driller. The ability to rotate views is also useful. Human interface 17 provides a way to input assumptions as to the size of the boundary stratum or to project a drilling heading onto the screen to further aid the driller in making necessary decisions.

Referring now to FIG. 1', them is illustrated the preferred embodiment of a logging tool 10' in accordance with the present invention while suspended in the vertical section of an earth borehole 12' on a string of drill pipe 14' from the earth's surface, such drill string including one or more drill collars 11'. A transmitter section comprised of transmitters 16', 18' and 20' are spaced along the length of the logging tool 10' from a receiver section 22' which includes a pair of receivers, sometimes referred to herein as $R_1$ and $R_2$. When using transmitter frequencies which are different, for example, 2 MHz and 1 MHz, one can, if desired, use a pair of coils in each receiver, one tuned to 2 MHz and one tuned to 1 MHz. Each pair of such coils in a receiver can, if desired, be laid side by side around the periphery of the tool 10', or can be concentrically stacked. The transmitters 16', 18' and 20', sometimes referred to herein as transmitters $T_1$, $T_2$ and $T_3$, respectively, are covered over with a non-conductive material as is well known in the prior art. Likewise, the receiver section 22' having receivers $R_1$ and $R_2$ is covered over with a non-conductive material. The transmitters and receivers can be fabricated in accordance with teachings of U.S. Pat. No. 4,940,943 assigned to the assignee of the present invention. It should be appreciated that the body of tool 10' is preferably made of steel in order to prevent the tool 10' from becoming a weak link in the drill string 14'. Typically, and in a manner well known in the art, one or more drill collars 24' are threadably connected to a lower end of the logging tool 10' and into which a drill bit (not illustrated) is threadably connected.

It should be appreciated that the logging tool 10' also has the requisite electronic circuitry (illustrated in FIG. 2) for processing the signals received by the receiver section 22' in accordance with the present invention, thereby converting the received signals into a log or another indication of formation resistivity. It should also be appreciated that the processed signals can be recorded within the electronics section of the tool 10' or may be fed by a conventional telemetry system (not illustrated) to the surface for concurrent processing and readout at the surface. Typical of such a well known telemetry system is one which generates mud pulses which can be detected at the earth's surface and which are indicative of the processed signals.

Referring now to FIG. 2', the well logging instruments 10' is illustrated as having a plurality of transmitters $T_1$, $T_2$, $T_3$ .... $T_n$. While the preferred embodiment contemplates only three such transmitters ($T_1$–$T_3$), $T_n$ is illustrated for purposes of showing that additional transmitters can be used if desired. It should be appreciated that $T_1$, $T_2$, $T_3$ .... $T_n$ are successively further spaced from the receiver pair $R_1$ and $R_2$. The distance between the coils used for $R_1$ and $R_2$ is typically six inches along the longitudinal axis of the instrument 10'. The distance the receiver pair and the successively spaced transmitters will vary in some applications as is discussed hereinafter in greater depth. Suffice it to say at this point that one typical configuration can show a distance between $T_1$ and $R_1/R_2$ of 12 inches/18 inches; the distance between $T_2$ and $R_1/R_2$ of 24 inches/30 inches; and a distance between $T_3$ and and $R_1/R_2$ of 36 inches/42 inches, it being understood that the number "12/18", for example, indicates that the distance between $T_1$ and $R_1$ is 12 inches and that the distance between $T_1$ and $R_2$ is 18 inches, based upon $R_1$ and $R_2$ being six inches apart.

Coupled, respectively, to the transmitter coils $T_1$, $T_2$, $T_3$ .... $T_n$ are a plurality of amplifiers $A_1$, $A_2$, $A_3$ .... $A_n$. The plurality of amplifiers, in turn, are driven, respectively, by oscillators $F_1$, $F_2$, $F_3$ .... $F_n$. It should be appreciated that the frequency is preferably on the order of two MHz. Because of power attenuation at greater depths of investigation such as is the case with the longer spaced transmitters, it is preferable that the frequency $F_1 \geq F_2 \geq F_3 \geq$ .... $F_n$. The preferred embodiment of the present invention contemplates that $F_1$ will be 2 MHz; $F_2$ will be 2 MHz; and $F_3$ will be 1 MHz. However, based upon various tests which have been conducted, the invention works quite well in the range of about 0.5 MHz up to about 4 MHz. The oscillators $F_1$, $F_2$, $F_3$ .... $F_n$ are controlled by the Transmitter Enable circuitry 30' which itself interfaces with a microprocessor 32', which in turn interfaces with a Communication Interface circuit 34' and an Analog to Digital Converter 36'. The Communications Interface circuitry 34' is conventional and provides an interface between computers, an internal memory, mud pulser, the microprocessor and operators or computers at the earth's surface after the tool 10' is removed to the earth's surface.

The differential receiver pair $R_1$ and $R_2$ are respectively connected to amplifiers 40' and 42' which are connected, respectively, to mixer circuits 44' and 46'.

A plurality of oscillators $F_1'$ and $F_2'$, $F_3'$ .... $F_n'$ are coupled through an Oscillator Select circuit 48' whose output is connected to the respective inputs of the mixer circuits 44' and 46'. The Oscillator Select circuit 48' receives its inputs from the Microprocessor circuitry 32'.

The respective outputs of the mixer circuitry 44' and 46' drive Low Pass Filters 50' and 52' whose outputs drive, respectively, the Amplitude Measurement circuits 54', 56' whose outputs are connected, respectively, to the Multiplexer circuit 60'. The outputs of the Low Pass Filter circuits 50' and 52' are also connected to the inputs of the Relative Phase Measurement circuit 62'.

In the operation of the device and the circuitry illustrated in FIG. 2', it should be appreciated that it is desirable to process intermediate frequency signals rather than the nominal 2 MHz signals received by the receiver pair $R_1$ and $R_2$. Accordingly, the oscillators $F_1'$, $F_2'$, $F_3'$ .... $F_n'$ are selected to be very near the corresponding frequencies $F_1$, $F_2$, $F_3$ .... $F_n$. For example, $F_n'$ can be set at a frequency of 1.998 MHz and thus provide an intermediate frequency coming out of the mixer circuit 44' or circuit 46' of 0.002 MHz (2 KHz). In a similar fashion, $F_2'$ and $F_3'$ can be set at 1.998 MHz and 0.998 MHz, respectively. Thus, the only signals that pass to the low pass filters 50' and 52' will be the intermediate frequencies which are obtained by mixing the frequencies of $F_1$, $F_2$, $F_3$ .... $F_n$ with the frequencies $F_1'$, $F_2'$, $F_3'$ .... $F_n'$, respectively. It should be appreciated that the amplitude measurement circuit 54' provides a measure of amplitude of the signal received by $R_1$, whereas circuit 56' measures the amplitude of the incoming signals received by the receiver $R_2$. Similarly, the relative phase measurement circuit 62' provides an indication of phase difference between the signals received at receiver $R_1$ and the signals received at receiver $R_2$. As is well known in the art, the amplitude measurements and the relative phase measurements are both indicative of formation resistivity, which, through time multiplexing, provides any combination desired of the amplitude and phase measurements.

It should be appreciated that the frequencies $F_1$, $F_2$, $F_3$ .... $F_n$ could all be the same frequency except for the practical considerations of power loss in the formation due to the increased distance the signals have to travel through the formation. However, the conventional multiplexer circuitry used with this system enables time separation between the sequential pulsing of the transmitters $T_1$, $T_2$, $T_3$ .... $T_n$. For example, as illustrated in FIG. 3', transmitter $T_1$ can be pulsed for one second, followed by no pulse for one second, followed by the pulsation of transmitter $T_2$ for one second, followed by no pulse for one second, followed by a pulsing of transmitter $T_3$ for one second, etc., etc. Quite obviously, the duration of the pulsing for each transmitter can be varied, as well as the duration of no pulsing in between, for example, as illustrated in FIG. 4'. It should be appreciated that the expression "time separation" between pulses includes the preferred embodiment of having one pulse commence immediately with the termination of the immediately preceding pulse. As desired, the duration of the pulses controlling $T_1$ may vary from the duration of the pulses for $T_2$ which may vary from the duration of the pulses for transmitter $T_3$ in order to provide a signature of the received pulses at receivers $R_1$ and $R_2$ to better identify the transmitters and thus the depth of investigation for the particular pulses being received. Thus, measurements are made to different depths into the formation by activating each transmitter at a different time such that only one transmitter is active at any one time and by recording or telemetering the received phase difference and/or amplitudes/(amplitude ratio) corresponding to each transmitted signal. Alternatively, the transmitters $T_1, T_2, T_3 \ldots T_n$ could all be operated at different frequencies and could be pulsed simultaneously, with the separation of signals being a function of frequency difference rather than establishing the difference by time separation in accordance with the preferred embodiment of this invention. However, and quite obviously, transmitting all of the transmitter signals simultaneously will usually result in the need for additional filters and processing circuitry to enable the instrument to properly discriminate between the different frequencies.

An important feature of the present invention is the attaining of an induction type of sensor response for the shallowest measurement, even though the sensor is operating at radio frequencies (around 2 MHz). This contravenes conventional wisdom in this area (see, e.g. Rodney, P. F. et al.: "The Electromagnetic Wave Resistivity MWD Tool", paper SPE 12167 presented at the 1983 SPE Annual Technical Conference and Exhibition, San Francisco, Oct. 5–8, 1983 and Dayev, D. S., *High-Frequency Electromagnetic Techniques of Well Logging*, "Nedra" Publishing House, Moscow (1974) 94–127, which would lead one to put the transmitter for the shallow spacing further from the receiver than is either necessary or desirable. The close proximity of the shallow transmitter to the receiver effectively puts the receiver within the induction zone of the shallow transmitter. Thus, propagation effects are largely negligible for the shallow receiver. This simplifies the borehole corrections which are needed for this sensor. Since it is extremely important that borehole corrections be properly applied to the shallow spaced measurements (since these are the most affected by the borehole), the approximate validity of geometric factor theory at this spacing is a definite advantage. Even more importantly, since the shallow measurement is in the induction zone, well established techniques for focusing the field of an induction sensor can be applied to the shallow measurement in order to minimize the influence of the borehole while still obtaining a shallow measurement in the formation (see, e.g., *Fundamentals of Formation Evaluation*, Donald P. Helander, OGCI Publications, Oil and Gas Consultants International, Inc., Tulsa, 1983, P. 110).

It has been fairly well established that there is a geometrical limit to the depth of investigation of an electromagnetic energy resistivity sensor given (diametrically) by the sum of the spacings of the near and far antennas from the transmitter. This applies to phase difference based measurements: amplitude based measurements are about 50% deeper. However, these are all rules of thumb. It has been established that the depth of investigation is a function of the formation, borehole and invaded zone resistivities and only approaches this limit at high mud and formation resistivities. In a borehole with 0.03 ohm meter mud, the skin depth is 2.43" at 2 MHz. Generally, under this condition, one would expect the actual investigation depth to fall far short of the maximum investigation depth. However, quite unexpectedly, we have found this to depend on the placement of the receiver antennas: the closer the receiver antennas are to the transmitter, the better their depth of investigation approximates the ideal value under all conditions. For example, the depth of investigation of a 24"/30" receiver pair under these conditions is about 22 inches: following conventional wisdom, one would expect a 9"/15" sensor to have a depth of investigation of $$\frac{22}{54} \times 24 = 9\ 7/8"$$

where 22 is indicative of the 22 inch depth of investigation for the 24"/30" sensor, the 54 comes from 24"+30", the maximum depth of investigation of the 24"/30" sensor and 24 comes from 9"/15" sensor. The actual depth of investigation was calculated to be 20" for the 9"/15" sensor; this was verified experimentally. The results are even more striking with a 6"/12" antenna spacing. Thus, as the receivers approach the transmitter, the investigation depth approaches the ideal investigation depth. In summary, we have determined that the preferred spacing between the closest transmitter and the closer receiver is 6"-12". The preferred range of spacing from the closest transmitter to the further receiver is 12"-18", preferably maintaining the 6" separation between receivers.

This can be understood theoretically as follows. The fields of an induction or propagating wave sensor are fairly well approximated by the fields of a magnetic dipole. The field of an oscillating magnetic dipole with its moment oriented along the z-axis is well known, as is given by: (*Electromagnetic Theory* by Julius Adams Stratton, McGraw-Hill Book Company, N.Y., 1941, P. 437.)

Note that when the product of the wave number and the distance from the near transmitter is small, the static and induction terms tend to dominate over the radiation term. In other words, the sensor tends to behave like an induction sensor. It is for this reason that induction type response is observed when the transmitter is very close to the receivers: the radiation term is insignificant. Although this might appear simple in retrospect, it was by no means obvious until we had actually built a sensor with a 12"/18" spacing of the receiver pair from the transmitter. This sensor read far deeper into the formation than we anticipated.

For this reason, one is forced to set the transmitter for the shallow measurements much closer to the receivers than would be expected, but one also obtains a 2 MHz measurement to which geometric factor theory can be applied (at least in approximation). This is a great advantage for it simplifies the borehole correction function and makes it possible to make accurate corrections for borehole effects. Note, however, in large diameter boreholes that the outer reaches of the borehole and the formation are again in the radiation zone so that geometric factor theory cannot be applied in large diameter boreholes. Nevertheless, for normal sized boreholes, the fact that the measurement is made in the induction zone means that methods traditionally used to focus an induction signal can be applied to the shallow measurement if desired in order to minimize borehole effects. As described in Helander, cited above, this focusing is typically accomplished in the prior art only by adding two to four additional antennas with currents directed opposite to that of the main transmitting antenna.

Thus, we have discovered that with proper placement of the shallowest transmitter, an induction-like response is obtained. Therefore, geometric factor theory can be applied to the shallowest measurement. This is of great advantage since the shallowest measurement, by its nature is the most affected by borehole conditions. The applicability of geometric factor theory implies that focusing techniques traditionally practiced at 20 KHz (a frequency two orders of magnitude lower than that of the present device) can be used to focus the shallow sensor and nearly eliminate borehole effects.

It is important to understand that if the instrument follows the geometric factor, the depth of investigation is essentially independent resistivity. This means, quite unexpectedly, that spacing uniquely defines depth. Application of this finding includes the following methods, where $L_1$ is the spacing between $T_1$ and $R_2$, and $L_2$ is the spacing between $T_1$ and $R_2$:

(1) $L_1$ designed to be $R_{borehole}+1"$ allows the majority of the signal to be reflective of the resistivity of a 1" annulus around the borehole. This virtually assures an $Rx_o$ measurement. Clearly, L, would be different for different size boreholes, and hence, tools.

| Tool Size | Diameter of Boreholes | $L_1$ Desired |
|---|---|---|
| 6-¾ | 8-½ | 5-½ |
|  | 9-⅞ | 6-½ |
| 8 | 9-⅞ | 6-½ |
|  | 12-¼ | 7-½ |
| 8 | 14-⅜ | 8-½ |
| 9-½ | 14-⅜ | 8-½ |
|  | 17-½ | 10 |

(2) If $L_1$ is shallow enough, differences between readings taken using the shallow sensor and those taken using deeper sensors could provide an estimate of shale hydration. This in turn is indicative of swelling and subsequent spalling (in some instances). Time lapse logging will show progression of these events, especially in conjunction with density measurements. In another application: if the shale is known not to be filtrate laden, density can be used as pore pressure indicates. Also, a good $Rx_o$ can be used to estimate porosity. If $R_w$ is known from a clear water sand $$Sw = \sqrt{\frac{F, R_w}{R_7}}$$

where $S_w$ is water saturation, F is formation factor, M is the Archie exponent, and $R_{mf}$ is the resistivity of the mud filtration.

In a fully flushed zone, Sw=1, $R_1$=$Rx_o$.

$$\therefore F = \frac{Rx_o}{R_{mf}} \quad \text{and} \quad F\alpha\phi^{-m}$$

The object of a multiple depth resistivity tool, typically, is to obtain resistivities of three or more depths of investigation to identify the invasion profile. Since a depth is generally defined as the distance at which 50% of the signal is obtained, significantly different depths are needed in order to be useful. In a resistive oil bearing formation we have:

| (Depth of investigation approximate inches) | | |
|---|---|---|
| 12"/18" | 24"/30" | 36"/42" |
| 25 | 50 | 73 |

This is a good spread and is amenable to invasion modeling. However, the most likely value of such a tool will be in assessing invasion in water zones. This is because in most instances the water zone below the oil contact is much more likely to be invaded than this oil zone and yet both will have similar permeability. A typical water zone will have resistivities in the vicinity of 0.2 ohm meters.

In developing this project, we had a surprising finding that the 12"/18" spacing reads a depth too close to the 24"/30" spacing in conductive formations. Also, ideally, one should want the shallow measurement to see $Rx_o$, and so a 24" depth is too great. Consequently, this finding drives out a tool design requiring a closer short spacing. A spacing too short will increase the borehole corrections especially in saline muds, so the preferred short spacing tools is somewhere between a 6"/12" and a 12"/18". Of course, the distance between the two receivers may also be adjusted from the preferred six inches shown without adversely impacting the logic. The borehole corrections mentioned above will be more significant at the higher resistivities, where the depth of investigation differences are acceptable even at 12"/18". In order to minimize these corrections, conventional wisdom would have persuaded us to use a short spacing of between 12"/18" and say 20"/26" (expecting depths of range of 13 to 21 inches). The new finding forces us to shorter spacings in a non-obvious fashion.

An additional advantage to the present invention is achieved by using a single pair of receiving antennas. The stability (mechanical, thermal and electrical) of the receiver electronics is far more important than the stability of the transmitters (which can result in a change of power level or a modest change in operating frequency). A sub can be configured with a plurality of transmitters, more than are actually needed for a specific application with little extra cost. The transmitters needed for a specific application can be selected, e.g., by rotating the transmitter insert into a number of pre-set configurations which link the oscillators with the appropriate transmitting antennas. This provides a sensor that requires minimal power consumption and can be used both in large diameter boreholes (where one might find it necessary to choose a rather large diameter of investigation for the shallowest reading) and small diameter boreholes (where it may be necessary to select a transmitting antenna extremely close to the receivers in order to make measurements in the flushed or invaded zones of the formation). The invention extends broadly to the concept of selectably moving the transmitter position to suit the application, one embodiment being the rotation of the insert.

Moreover, although the preferred embodiment contemplates the use of a plurality of sequentially spaced transmitters, the invention is also inclusive of using a single electromagnetic energy transmitter operating in a frequency range of about 0.5 MHz–4.0 MHz in conjunction with a single pair of receivers spaced in the range of 6"/12"–12"/18" from such single transmitter.

Also, the invention contemplates the generation of the characteristic signature of FIG. 9 using a single transmitter which is further spaced from the receiver pair, for example, at 24"/30" or at 36"/42", or also using two or more such longer spaced transmitters to create the characteristic signature.

We claim:

1. An apparatus for detecting, while drilling in a substantially horizontal subsurface zone, the approach of boundary stratum, comprising:

a tubular housing means having a longitudinal axis therethrough and threaded at each end for threaded engagement in a drill string above the drill bit;

means for transmitting electromagnetic energy into the formation surrounding said housing means, said transmitting means including a plurality of electromagnetic energy transmitters each having an output frequency in the range of 0.5–4.0 MHz, sequentially disposed about the exterior of said housing means along the length of said longitudinal axis, said plurality of transmitters including first and second transmitters having a first, common output frequency and a third transmitter having a second output frequency different from said first output frequency;

means for receiving electromagnetic energy from said formation, said receiving means including only a single pair of receivers sequentially disposed about the exterior of said housing means along the length of said longitudinal axis, the first of said plurality of transmitters being spaced a predetermined distance from the first of said pair of receivers, and said second and third transmitters being sequentially spaced further along said longitudinal axis from said first receiver than said first transmitter is spaced from said first receiver;

means for converting said received electromagnetic energy into a plurality of signals functionally related to the formation resistivity at different depths of investigation; and means for comparing said plurality of signals to determine the approach of a boundary stratum.

2. The apparatus according to claim 1, including in addition thereto, means responsive to the output of said comparing means for turning the drill string away from the boundary stratum to keep the borehole within the substantially horizontal subsurface zone.

3. An apparatus for detecting, while drilling in a substantially horizontal subsurface zone, the approach of boundary stratum, comprising:

a tubular housing means having a longitudinal axis therethrough and threaded at each end for threaded engagement in a drill string above the drill bit;

means for transmitting electromagnetic energy into the formation surrounding said housing means, said transmitting means including a plurality of electromagnetic energy transmitters each having an output frequency in the range of 0.5–4.0 MHz, sequentially disposed about the exterior of said housing means along the length of said longitudinal axis, said plurality of transmitters including at least two transmitters having a first common output frequency and at least one additional transmitter having a second output frequency different from said first output frequency;

means for receiving electromagnetic energy from said formation, said receiving means including first and second receivers sequentially disposed about the exterior of said housing means along the length of said longitudinal axis, the closest of said transmitters being spaced a predetermined distance from the first said receiver, and each of the other said transmitters being sequentially spaced further along said longitudinal axis from said first receiver than said closest transmitter is spaced from said first receiver;

means for converting said received electromagnetic energy into a plurality of signals functionally related to the formation resistivity at different depths of investigation; and means for comparing said plurality of signals to determine the approach of a boundary stratum.

4. The apparatus according to claim 3, including in addition thereto, means responsive to the output of said comparing means for turning the drill string away from the boundary stratum to keep the borehole within the substantially horizontal subsurface zone.

5. An apparatus for detecting, while drilling in a substantially horizontal subsurface zone, the approach of boundary stratum, comprising:

a tubular housing means having a longitudinal axis themthrough and threaded at each end for threaded engagement in a drill string above the drill bit;

means for transmitting electromagnetic energy into the formation surrounding said housing means, said transmitting means including a plurality of electromagnetic energy transmitters each having an output frequency in the range of 0.5–4.0 MHz, sequentially disposed about the exterior of said housing means along the length of said longitudinal axis, said plurality of transmitters including a first transmitter having a first output frequency and a second transmitter having a second output frequency substantially different from said first output frequency;

means for receiving electromagnetic energy from said formation, said receiving means including a single pair of receivers sequentially disposed about the exterior of said housing means along the length of said longitudinal axis, the first transmitter being spaced a predetermined distance from the first of said pair of receivers, and said second transmitter being sequentially spaced further along said longitudinal axis from said first receiver than said first transmitter is spaced from said first receiver;

means for converting said received electromagnetic energy into a plurality of signals functionally related to the formation resistivity at different depths of investigation; and means for comparing said plurality of signals to determine the approach of a boundary stratum.

6. The apparatus according to claim 5, including in addition thereto, means responsive to the output of said comparing means for turning the drill string away from the boundary stratum to keep the borehole within the substantially horizontal subsurface zone.

7. The apparatus according to claim 5, wherein said first transmitter has an output frequency of 2.0 MHz, and said second transmitter has an output frequency of 1.0 MHz.

8. The apparatus according to claim 6, wherein said first transmitter has an output frequency of 2.0 MHz, and said second transmitter has an output frequency of 1.0 MHz.

9. An apparatus for detecting, while drilling in a substantially horizontal subsurface zone, the approach of boundary stratum, comprising:

a tubular housing means having a longitudinal axis therethrough and threaded at each end for threaded engagement in a drill string above the drill bit;

means for transmitting electromagnetic energy into the formation surrounding said housing means, said transmitting means including a plurality of electromagnetic energy transmitters each having an output frequency in the range of 0.5–4.0 Mhz, sequentially disposed about the exterior of said housing means along the length of said longitudinal axis, said plurality of transmitters including at least one transmitter having a first output frequency and at least one transmitter having a second output frequency substantially different from said first output frequency;

means for receiving electromagnetic energy from said formation, said receiving means including first and second receivers sequentially disposed about the exterior of said housing means along the length of said longitudinal axis, the closest of said transmitters being spaced a predetermined distance from the first said receiver, and each of the other said transmitters being sequentially spaced further along said longitudinal axis from said first receiver than said closest transmitter is spaced from said first receiver;

means for converting said received electromagnetic energy into a plurality of signals functionally related to the formation resistivity at different depths of investigation; and means for comparing said plurality of signals to determine the approach of a boundary stratum.

10. The apparatus according to claim 9, including in addition thereto, means responsive to the output of said comparing means for turning the drill string away from the boundary spectrum to keep the borehole within the substantially horizontal subsurface zone.

11. The apparatus according to claim 9, wherein said first output frequency is 2.0 MHz, and said second output frequency is 1.0 MHz.

12. The apparatus according to claim 10, wherein said first output frequency is 2.0 MHz, and said second output frequency is 1.0 MHz.

* * * * *

UNITED STATES PATENT AND TRADEMARK OFFICE
CERTIFICATE OF CORRECTION

PATENT NO. : 5,495,174

DATED : Feb. 27, 1996

INVENTOR(S) : M. Vikram Rao and Paul F. Rodney

It is certified that error appears in the above-identified patent and that said Letters Patent is hereby corrected as shown below:

In column 13, line 66, change "themthrough" to --therethrough--.

In column 14, line 54, change "Mhz" to --MHz--.

In column 16, line 4, change "spectrum" to --stratum--.

Signed and Sealed this

Sixteenth Day of July, 1996

Attest:

BRUCE LEHMAN

Attesting Officer

Commissioner of Patents and Trademarks